(12) United States Patent
Leigh

(10) Patent No.: US 10,375,458 B2
(45) Date of Patent: Aug. 6, 2019

(54) CONNECTION BETWEEN COMPUTING DEVICES AND A NETWORK DEVICE VIA OPTICAL SIGNALS

(71) Applicant: HEWLETT PACKARD ENTERPRISE DEVELOPMENT LP, Houston, TX (US)

(72) Inventor: Kevin B Leigh, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/752,247

(22) PCT Filed: Aug. 14, 2015

(86) PCT No.: PCT/US2015/045424
§ 371 (c)(1),
(2) Date: Feb. 12, 2018

(87) PCT Pub. No.: WO2017/030544
PCT Pub. Date: Feb. 23, 2017

(65) Prior Publication Data
US 2019/0028784 A1    Jan. 24, 2019

(51) Int. Cl.
*H04J 14/02* (2006.01)
*H04Q 11/00* (2006.01)

(52) U.S. Cl.
CPC ........ *H04Q 11/0005* (2013.01); *H04J 14/028* (2013.01); *H04J 14/0257* (2013.01);
(Continued)

(58) Field of Classification Search
CPC .................. H04J 14/0227; H04J 14/0228
See application file for complete search history.

(56) References Cited

U.S. PATENT DOCUMENTS 6,016,211 A    1/2000   Szymanski et al.
6,396,815 B1   5/2002   Greaves et al.
(Continued)

FOREIGN PATENT DOCUMENTS

CN    1360416    7/2002
CN    1901438    1/2007
(Continued)

OTHER PUBLICATIONS

Onur Turkcu, "Performance of optical networks with limited reconfigurability," IEEE/ACM Transactions on Networking (TON), vol. 17, No. 6, Dec. 2009, pp. 2002-2013.
(Continued)

*Primary Examiner* — Shi K Li
(74) *Attorney, Agent, or Firm* — Hewlett Packard Enterprise Patent Department

(57) ABSTRACT

Examples disclosed herein relate, in one aspect to a method. The method may include determining an input bandwidth capacity of a network device comprising a network device port coupled to a plurality of computing devices; based on the input bandwidth capacity; generating a management signal, the management signal indicating a set of output lanes for each of the plurality of computing devices and indicating a different wavelength for each of the set of output lanes of each of a plurality of computing devices; sending the management signal to the plurality of computing devices through an optical bus; and receiving, through the optical bus, an optical signal comprising, for each computing device, a set of output signals from the set of output lanes indicated by the management signal, each output signal being represented by a wavelength indicated by the management signal.

15 Claims, 13 Drawing Sheets

(52) U.S. Cl.
CPC ..... *H04Q 11/00* (2013.01); *H04Q 2011/0016* (2013.01); *H04Q 2011/0039* (2013.01); *H04Q 2011/0041* (2013.01); *H04Q 2213/1301* (2013.01); *H04Q 2213/1332* (2013.01); *H04Q 2213/13292* (2013.01)

(56) References Cited

U.S. PATENT DOCUMENTS

| | | |
|---|---|---|
| 6,873,796 B1 | 3/2005 | Nakahira |
| 6,882,766 B1 | 4/2005 | Corbalis et al. |
| 7,298,974 B2 | 11/2007 | Tanobe et al. |
| 7,697,844 B2 | 4/2010 | Guo et al. |
| 7,742,395 B1 | 6/2010 | Chaudhuri et al. |
| 7,986,878 B2 | 7/2011 | Saunders et al. |
| 2002/0071151 A1 | 6/2002 | Zaacks et al. |
| 2002/0154357 A1 | 10/2002 | Ozveren et al. |
| 2003/0118270 A1 | 6/2003 | Miyano et al. |
| 2006/0115271 A1 | 6/2006 | Hwang et al. |
| 2006/0153496 A1 | 7/2006 | Tanobe et al. |
| 2008/0056135 A1 | 3/2008 | Lee et al. |
| 2008/0131128 A1 | 6/2008 | Ota |
| 2011/0020006 A1 | 1/2011 | Christensen |
| 2011/0179208 A1 | 7/2011 | Koka |
| 2011/0200332 A1 | 8/2011 | McCracken et al. |
| 2011/0211843 A1 | 9/2011 | Tan |
| 2012/0155871 A1* | 6/2012 | Fukashiro ............... H04J 14/02 398/50 |
| 2012/0321309 A1 | 12/2012 | Barry et al. |
| 2012/0328292 A1 | 12/2012 | Testa et al. |
| 2013/0230315 A1 | 9/2013 | Sarashina |
| 2014/0105600 A1 | 4/2014 | Dahlfort |
| 2014/0270764 A1 | 9/2014 | DeCusatis et al. |
| 2014/0286640 A1 | 9/2014 | Tajima et al. |
| 2014/0363160 A1* | 12/2014 | Gumaste ............ H04J 14/0212 398/48 |

FOREIGN PATENT DOCUMENTS

| | | |
|---|---|---|
| CN | 103475439 | 12/2013 |
| WO | WO-2014-062110 | 4/2014 |
| WO | WO-2015116055 A1 | 8/2015 |

OTHER PUBLICATIONS

PCT/ISA/KR, International Search Report, dated Jun. 17, 2016, PCT/US2015/045424, 14 pages.

Yang, H. et al., Onu Migration in Dynamic Time and Wavelength Division Multiplexed Passive Optical Network (Twdm-Pon), (Research Paper), Sep. 9, 2013, 9 Pages.

Gumaste, A., et al.; "Scheduling Algorithms in LiTPiC—Digital Optical Networks using Light-trails and Photonic Integrated Circuits"; 2009; 8 pages.

PCT; "Notification of Transmittal of the International Search Report and the Written Opinion of the International Searching Authority, or the Declaration"; Dec. 10, 2012; 9 Pages.

* cited by examiner

US 10,375,458 B2

CONNECTION BETWEEN COMPUTING DEVICES AND A NETWORK DEVICE VIA OPTICAL SIGNALS

BACKGROUND

A network device, such as an edge network switch in a datacenter, may be used to transfer data between a first set of computing devices (e.g., downstream servers) and a second set of computing devices (e.g., another network switch), in some cases, the total amount of bandwidth from the first set of devices may exceed the available bandwidth between the network device and the second set of devices, in which case the network device is said to be over-subscribed.

BRIEF DESCRIPTION OF THE DRAWINGS

The following detailed description references the drawings, wherein.

DETAILED DESCRIPTION

Figure 1A:
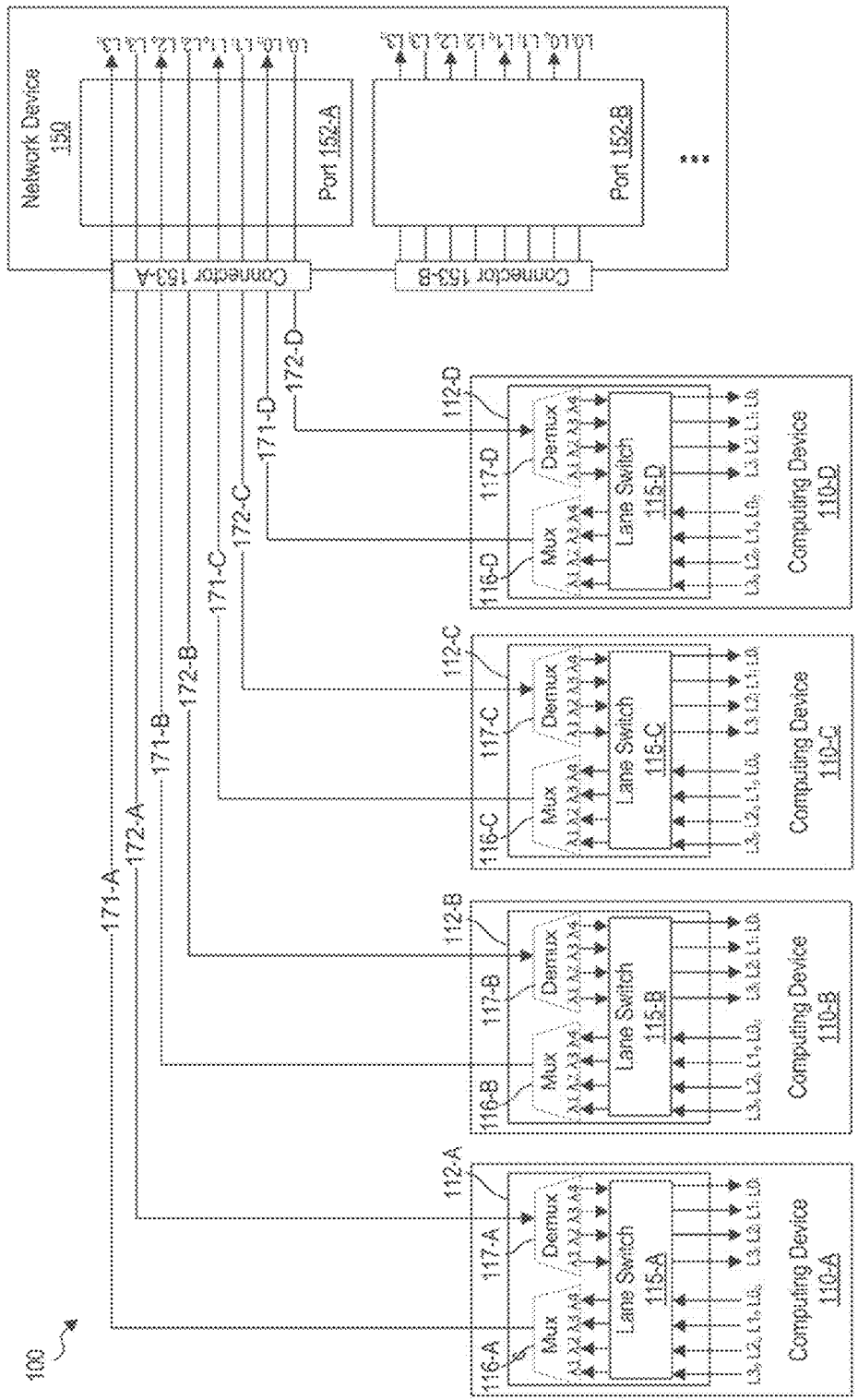
FIGS. 1A-1C show examples of a network system.

As mentioned above, a network device may sometimes be over-subscribed, for example, when its downstream bandwidth exceeds its upstream bandwidth capacity, limiting downstream bandwidth from devices connected to the network device vis dedicated connections of fixed bandwidth, such as multi-fiber push-on (MPO) cables, will cause many downstream connections to be unused or underutilized. For example, a downstream computing device often may not need the full bandwidth of the network device port to which it is connected, but any available bandwidth at that network device port may be stranded, i.e., unusable by other computing devices connected to other network device ports. Stranded bandwidth on multiple network ports may force the network administrator to add additional network devices to meet the total bandwidth requirement of the system (e.g., a datacenter), causing inefficient use of system resources such as power, end increasing overall system cost.

Examples disclosed herein describe, among other things, a network device that includes a network device port. The network device port may be coupled to a plurality of computing devices via an optical bus. The network device may obtain, by the network port, a plurality of electrical output signals from the network device, and produce, by the network port, an optical output signal representing a management signal and the plurality of electrical output signals, where the management signal and the plurality of output signals may foe represented in the optical output signal by different wavelengths, and where the management signal may select a set of output lanes from a plurality of output lanes of each of the plurality of computing devices, and assign wavelength to each of the set of output lanes. The network device may also provide, by the network device port, the optical output signal to each of the plurality of computing devices through the optical bus; and receive, by the network port, through the optical bus, an optical input signal comprising, for each computing device, a set of output signals from the set of output lanes selected by the management signal, each output signal being represented by a wavelengths assigned by the management signal.

Thus, examples disclosed herein may enable sharing of bandwidth of a network device port by multiple computing devices via optical components and cables. As discussed above, this may reduce the total number of fibers network devices and/or device ports and the number of fibers used for connecting the computing devices to the network device, thereby reducing the overall system complexly, power consumption, cost, etc. For example, in some examples illustrated below, the number of computing devices that the same network device may support is increased by a factor of four, and the number of long optical fibers connecting computing devices to the network device may is decreased by a factor of 24 (e.g., twelve-fiber cables connecting each computing device are replaced with one two-fiber cable shared by four computing devices). In addition, in some examples discussed herein, the maximum bandwidth of each computing device may be increased (e.g., by a factor of four), which provides additional flexibility in bandwidth allocation among a plurality of computing devices and further increasing the resource utilization of the system.

FIG. 1A is a block diagram of an example network system 100. System 100 may include among other things, a network device 150 that may be communicatively coupled, through a network device port (e.g., 152-A) to a set of one or more computing devices 110 (e.g., 110-A, 110-B, 110-C, 110-D). Two devices are said to be communicatively coupled, for example, when they can exchange information to communicate via physical ports. Port 152-B may be communicatively coupled to additional computing devices, not shown for brevity. In some examples, network device ports 152-A and 152-B may be downstream ports, and network device 150 may include additional downstream ports, as well as upstream ports through which network device 150 may be communicatively coupled to other network or computing devices, not shown for brevity.

Computing device 110 may be any type of electronic device or a combination of electronic devices capable of communicating with network device 150 as described below. For example, computing device 110 may be any type of a server (e.g., a blade server, a rack server, and the like), a network switch, a router, a desktop computer, and the like. In some examples, a number of computing devices 110 may be enclosed in an enclosure such as a server rack. Each computing device 110 may include one or more communication ports 112 through which computing device 100 may communicate with network device 150.

Network device 150 may also be any type of electronic device or a combination of electronic devices capable of communicating with the set of one or more computing devices 110. For example, network device 150 may be a network switch, a router, a server, a desktop computer, and the like. As mentioned above, network device 150 may be also connected to a number of network devices (e.g., network switches) and/or a number of computing devices (e.g., servers) on the upstream side, not shown in FIG. 1A for brevity. Network device 150 may transfer data from the upstream devices to the downstream devices (e.g., computing devices 110) and vice versa. As also discussed above, in some examples, network device 150 may be over-subscribed, moaning that the required downstream bandwidth may exceed the upstream bandwidth capacity.

In some examples, each computing device 110 may be communicatively coupled to network device 150 via a first optical waveguide 171 and a second optical waveguide 172. For example, as illustrated in FIG. 1A, computing devices 110-A, 110-B, 110-C, and 110-D may be connected to network device 150 via the following pairs of optical waveguides: 171-A and 172-A, 171-B and 172-B, 171-C and 172-C, and 171-D and 172-D, respectively. Each optical waveguide 171 and 172 may be a single optical fiber of any type, a polymer waveguide, and the like. In some examples, a pair of optical fibers 171 and 172 may be parts of the same optical cable, such as a two-fiber Lucent Connector (LC) duplex cable.

In some examples, a plurality of computing devices 110 (e.g., 110-A, 110-B, 110-C, and 110-D) may be coupled to the same port 152 (e.g., 152-A) of network device 150, thereby freeing other ports (e.g., 152-B) for other connections and thus increasing the number of downstream devices that can be support by network device 150 having a certain number of ports. In the example of FIG. 1A, each computing device 110 is coupled via a corresponding pair of optical waveguides 171 and 172 to port 152-A via an optical connector 153. In some examples, port 152 may convert any optical signals received from computing devices 110 through waveguides 171-A, 171-B, 171-C, and 171-D into electrical signals, and provide the electrical signals to lanes L0-L3. Specifically, the electrical signals may be provided to the inputs of lanes L0-L3, indicated in FIG. 1A as input lanes $L0_i$-$L3_i$. Similarly, port 152 may convert any electrical signals obtained at outputs of lanes L0-L3 (indicated as output lanes $L0_o$-$L3_o$) into optical signals, and provide the optical signals into optical waveguides 172-A, 172-B, 172-C, and 172-D.

In some examples, each computing device 110 may include a communication port 112. Port 112 may be coupled to optical waveguides 171 and 172 through an optical connector 113 shown in FIG. 1C, but not shown in FIG. 1A for brevity. Port 112 may convert any optical signals received from network device 150 through optical waveguides 172-A, 172-B, 172-C, and 172-D into electrical signals, and pass the electrical signals to input lanes $L0_i$-$L3_i$). Similarly, port 112 may convert any electrical signals obtained at output lanes $L0_o$-$L3_o$ into optical signals, and pass the optical signals into optical waveguides 171-A, 171-B, 171-C, and 171-D.

In some examples, computing device 110 may include, among other things, a lane switch 115, a multiplexer 116, and a demultiplexer 117, Lane switch 115 may in some examples be a part of an optical receiver, transmitter, or transceiver included in computing device 110. Lane switch 115 may obtain one of a plurality of electrical signals at output lanes $L0_o$-$L3_o$ from other components (e.g., a processor, a memory, or other modules) of computing device 110, selectively convert the electrical signal into an optical signal associated with (e.g., modulated using) a particular wavelength (e.g., one of predefined wavelengths λ1, λ2, λ3, and λ4), and selectively route the optical signal to one of a plurality of outputs of lane switch 115 connected to one of a plurality of inputs of multiplexer 116, where signals associated with different wavelengths may be routed to different outputs of lane switch 115 and inputs of multiplexer 116. Thus, each output of lane switch 115 (and the corresponding input of multiplexer 116) may be associated with a different wavelength. Similarly, lane switch 115 may obtain a plurality of optical signals from demultiplexer 117, convert the optical signals into electrical signals, and selectively route each electrical signal to one of a plurality of input lanes $L0_i$-$L3_i$ that may be connected to other components (e.g., a processor, a memory, or other modules) of computing device 110.

Multiplexer 116 may be any type of optical multiplexer, in some examples, multiplexer 116 may receive a plurality of optical signals from lane switch 115, select a set of zero, one, or more signals from the plural sly of optical signals, and provide the set of selected signals to the output of multiplexer 116, which may be coupled (e.g., via connector 113) to optical waveguide 171. In some examples, if multiplexer receives two or more optical signals with different wavelengths, multiplexer 116 may provide to waveguide 171 optical signal that represents each of the signals, where each signal may be associated with a different wavelength (e.g., filtered by a different bandpass filter). That is, multiplexer 116 may perform wave-division multiplexing (WDM) to provide into waveguide 171 an optical signal that combines a plurality of optical signals having different wavelengths into a single optical signal comprising each of the plurality of optical signals.

Demultiplexer 117 may be any type of optical demultiplexer. The input of demultiplexer 117 may be coupled (e.g., via connector 113) to optical waveguide 172, through which demultiplexer 117 may receive one or more signals from network device 150. The received signals may include management signals (discussed in more detail below) and data signals. In some examples, each signal received by demultiplexer 117 from waveguide 172 may be associated with a different wavelength. Demultiplexer 117 may extract each optical signal having different wavelength from waveguide 172 and provide each extracted optical serial at one of the outputs of demultiplexer 117. In some examples, each output or demultiplexer 117 may be associated with one of a plurality of predefined wavelength (e.g., λ1, λ2, λ3 and λ4) and demultiplexer 117 may provide each extracted signal at the output associated with the same wavelength as the extracted signal. In some examples, the outputs of demultiplexer 117 may be coupled to inputs of lane switch 115, which may selectively route each outputs of demultiplexer 117 to one of the input lanes $L0_i$-$L3_i$ connected to other components (e.g., a processor, a memory, or other modules) within computing device 110.

In some examples, each computing device 110 may receive from network device 150 a management signal representing management data. In some examples, the management signal may be received by computing device 110 through optical waveguide 172, in some examples, the management signal may be associated with (e.g., filtered with) a predefined wavelength (e.g., one of wavelengths λ1, λ2, λ3 or λ4, or another dedicated wavelength), and demultiplexer 117 may extract the management signal from the optical signal, and pass the management signal to lane switch 115, and/or any other components of computing device 110 that may be controlled by the management signal. Thus, the management signal may be used to control lane switch 115, multiplexer 116, or other components (e.g., management processor of computing device 110, not shown for brevity) controlling lane switch 115 and multiplexor 116, in order to dynamically select the routing, selection, and wavelength assignments to various input and output signals in computing device 110, as discussed in various examples provided herein.

In some examples, the management signal may indicate which of the plurality of output signals obtained at output lanes $L0_o$-$L3_o$, if any, may be transmitted by computing device 110 to network device 150 through optical waveguide 171. In some examples, the management signal may also indicate which wavelength (e.g., λ1, λ2, λ3 or λ4) is to be assigned to each transmitted signal. In some examples, the management signal may also indicate which optical signals (data signals and/or management signals) received by computing device 110 through waveguide 172, if any, are directed to the particular computing device 110, and to which input lanes $L0_i$-$L3_i$ such signal should be provided. In some examples, lane switch 115 may route input and output signals to and from multiplexer 116 and demultiplexer 117 in accordance with the management signal, and multiplexer 116 may select its inputs in accordance with the management signal. Thus, network device 150 may use management signals to control which signals are obtained from which computing device 110 and using which wavelengths. It is appreciated that in some examples, lane switch 115, multiplexer 116, and/or demultiplexer 117 may be omitted from computing device 110, and some of the routing, selection, and filtering functionality described above may be hardwired and may be independent of the management signal.

Figure 1B:
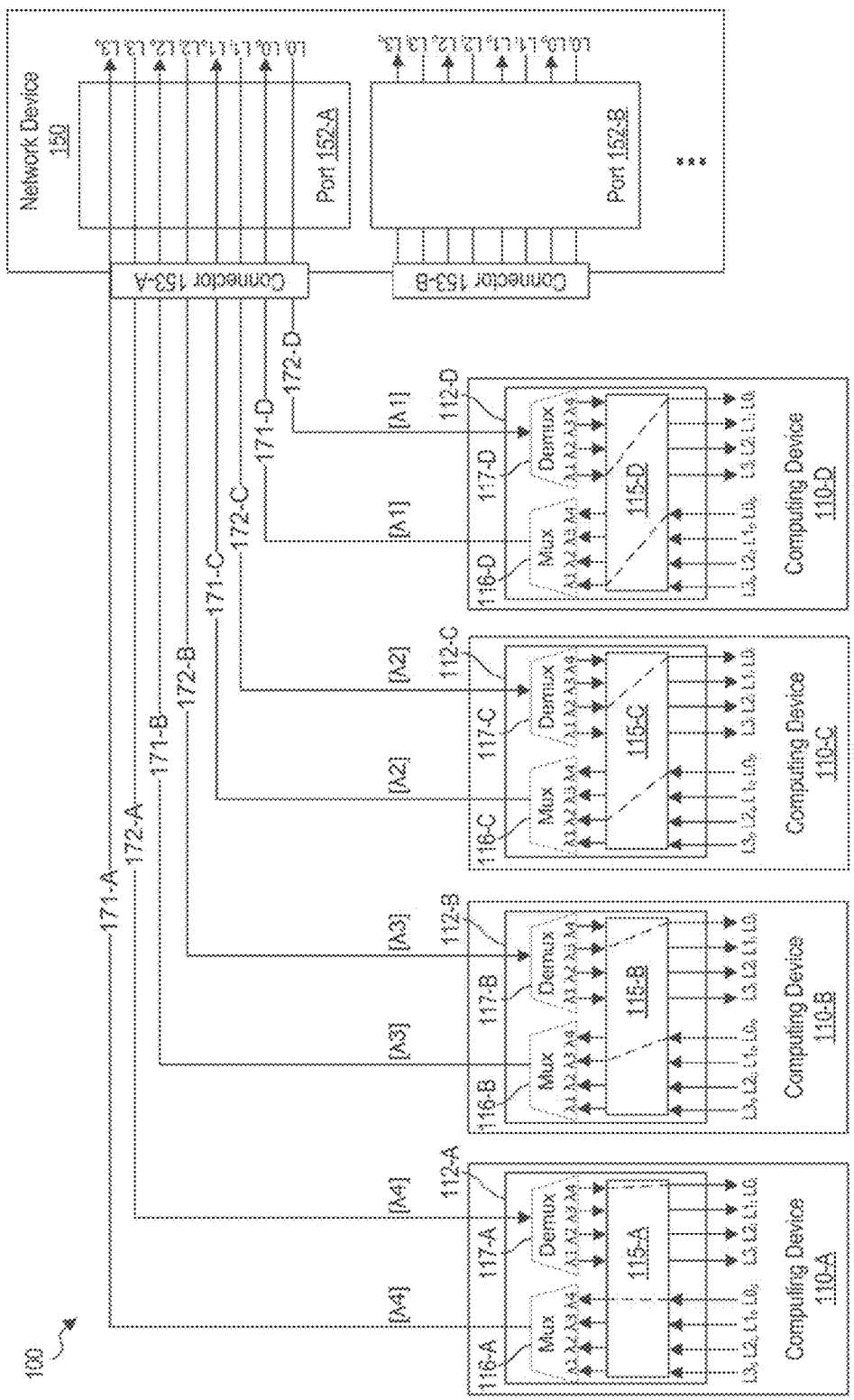

In the example illustrated in FIG. 1B, network device 150 configures computing devices 110-A, 110-B, 110-C, and 110-D (e.g., using the management signal) to transmit signals obtained at output lane $L0_o$ and to associate those signals with wavelengths $\lambda 4$, $\lambda 3$, $\lambda 2$, and $\lambda 1$, respectively. Network device 150 further configures computing devices 110-A, 110-B, 110-C, and 110-D to route input signals associated with wavelengths $\lambda 4$, $\lambda 3$, $\lambda 2$, and $\lambda 1$, respectively, to input lane $L0_i$, and to discard all other input signals.

Figure 1C:
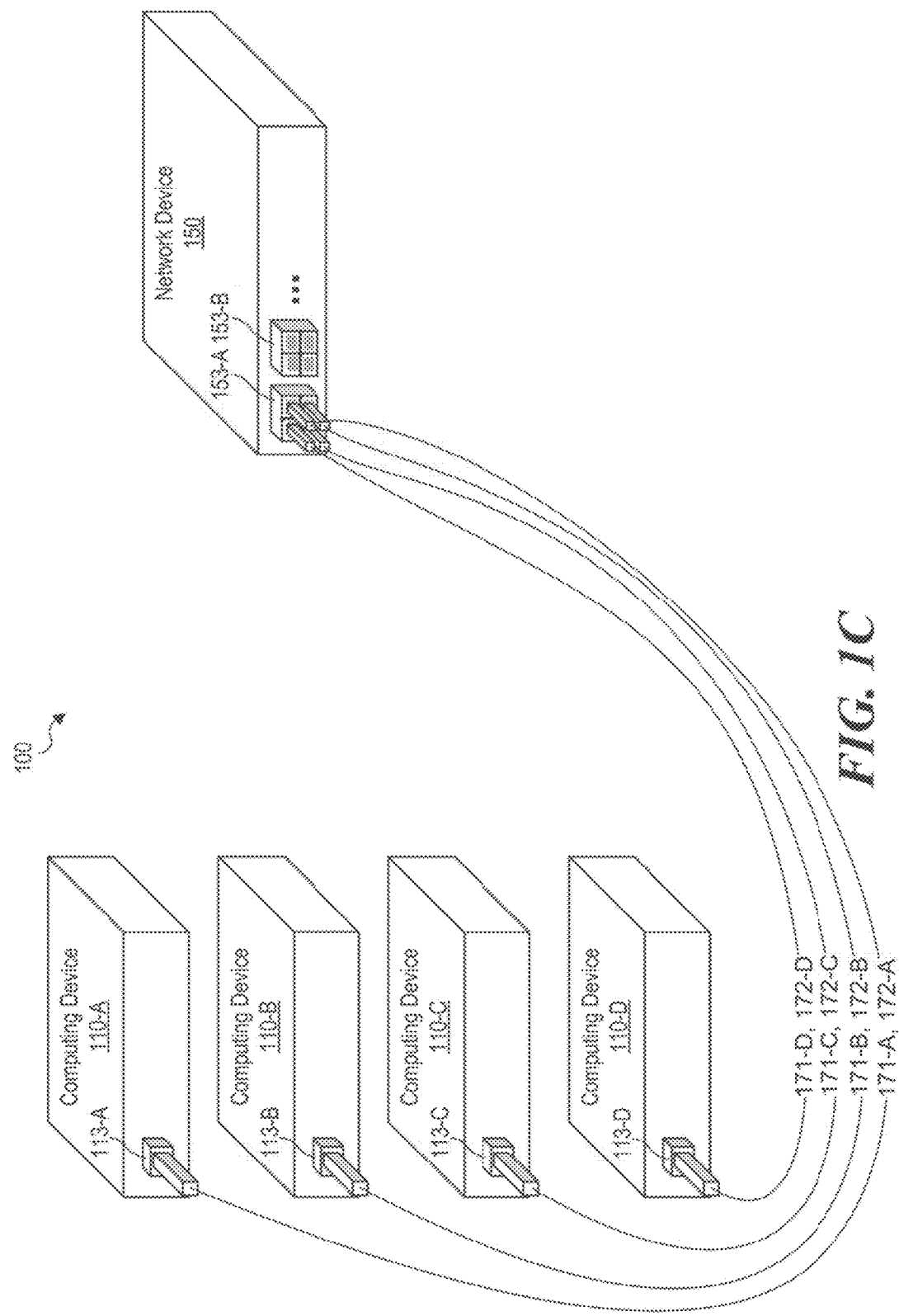

FIG. 1C further illustrates system 100 in accordance with some examples. As illustrated in FIG. 1C, each computing device 110 may be coupled to network device 150 via an optical cable (e.g., an LC duplex cable) that includes both optical waveguides 171 and 172. The optical cable may connect each computing device 110 to network device 150, e.g., by optically coupling connectors 113 (e.g., 113-A, 113-B, 113-C, and 113-D) to connector 153 (e.g., 153-A), where connectors 113 may be, for example, two-fiber LC connectors.

Figure 2A:
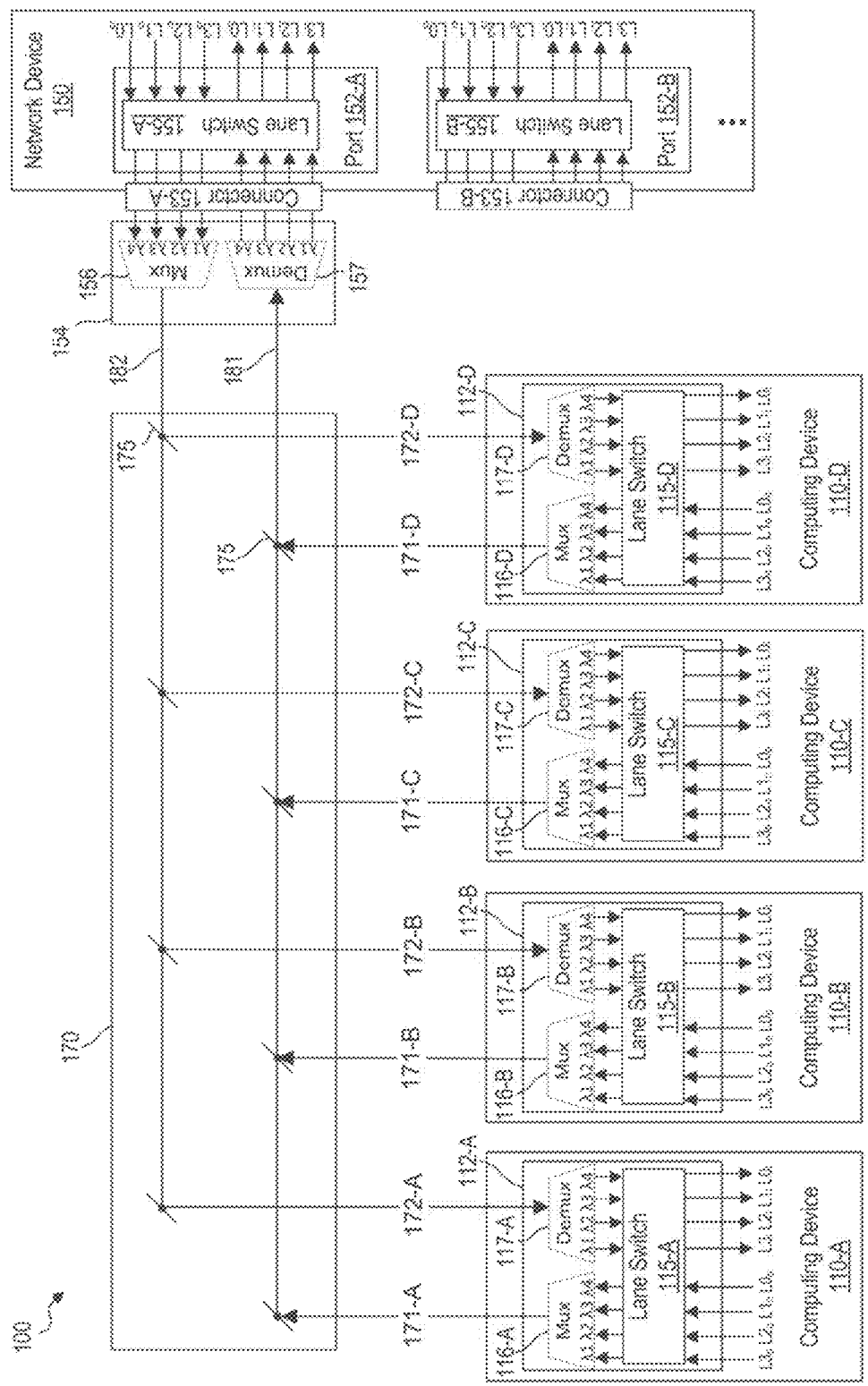
FIGS. 2A-2D show other examples of the network system.

FIG. 2A shows another block diagram of an example system 100. In the example of FIG. 2A, each computing device 110 is coupled to network device 150 through an optical bus 170. As illustrated in FIG. 2A, optical bus 170 may in some examples be coupled to each computing device 110 via optical waveguides 171 and 172. Optical bus 170 may also be coupled to a multiplexer 156 and to a demultiplexer 157. Multiplexer 156 may, in some examples, be similar to multiplexer 116. Accordingly, multiplexer 156 may receive a plurality of optical signals from network device 150, select a set of zero, one, or more signals from the plurality of optical signals, and output a signal representing the set of signals, where each selected signal may be and represented by or associated with a different wavelength, such as a predefined wavelength associated with the input at which the selected signal was received.

Demultiplexer 157 may, in some examples, be similar to demultiplexer 117. Accordingly, demultiplexer 157 may receive from bus 170 an optical signal representing plurality of signals, each signal being represented by or associated with a different wavelength. Demultiplexer 157 may extract each signal of the plurality of signals from the received optical signal, and provide each extracted signal at the output of demultiplexer 157 that is associated with the same wavelength as the extracted signal.

Multiplexer 156 and demultiplexer 157 may be parts of separate modules or devices, or they may be integrated into a single optical module 154. In some examples, module 154 may be attachable to, pluggable into, or otherwise coupled to connector 153-A of pod 152-A of network device 150, and may also be attachable to, pluggable into, or otherwise coupled (e.g., via one or more cables) to optical bus 170. In some examples, each port 152 of network device 150 may include a lane switch 155. Lane switch 155 may be similar to lane switch 115, Accordingly, lane switch 155 may convert and selectively route electrical signals from output lanes $L0_o$-$L3_o$ to optical outputs of connector 153 (and inputs of multiplexer 156), and convert and mute optical signals from inputs of connector 153 (and outputs of demultiplexer 157) to electrical signals at input lanes $L0_i$-$L3_i$.

In some examples, bus 170 may combine a plurality of optical signals received from computing devices 110 through waveguides 171-A, 171-B, 171-C, and 171-D into a single optical signal representing each of the plurality of optical signals. For example, bus 170 may use a plurality of partially transparent mirrors 175 to combine signals carried by waveguides 171-A, 171-B, 171-C, and 171-D into a single optical waveguide 181. Similarly, bus 170 may use partially transparent mirrors 175 to replicate an optical signal (which may include a plurality of optical signals) received from module 154 through optical waveguide 182, and to deliver the optical signal to computing devices 110-A, 110-B, 110-C, and 110-D by providing the optical signal into waveguides 172-A, 172-B, 172-C, and 172-D, respectively. It is appreciated that in some examples bus 170 may use components other than partially transparent mirrors to combine and/or replicate the optical signals.

Figure 2B:
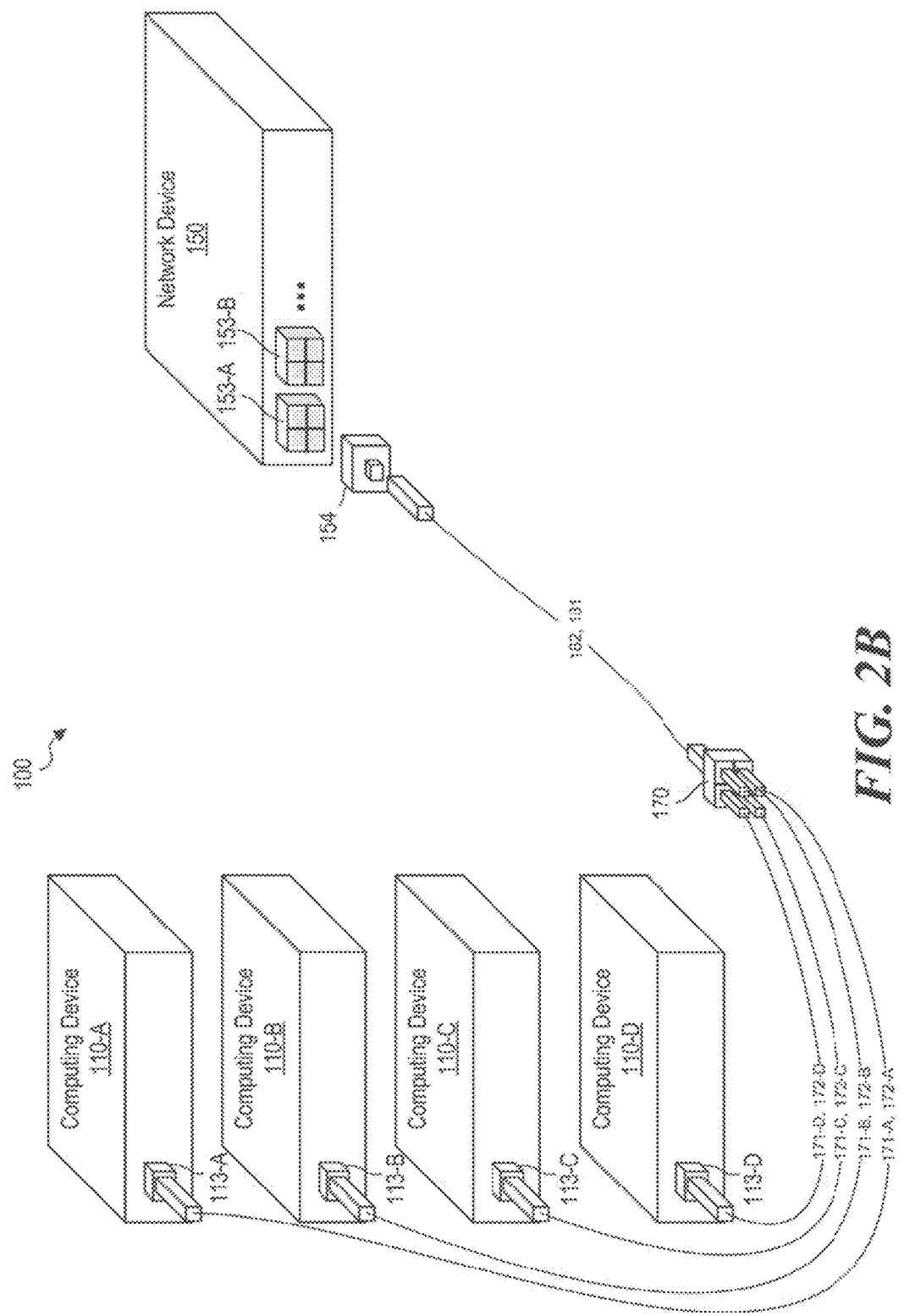

In some examples, as illustrated in FIG. 2B, optical bus 170 may be coupled to module 154 via an optical cable, such as an LC duplex cable, that includes optical waveguides 181 and 182. In some examples, to reduce the total cable length, the optical cable connecting bus 170 and module 154 may be longer than the optical cables connecting computing devices 110 to bus 170.

Figure 2C:
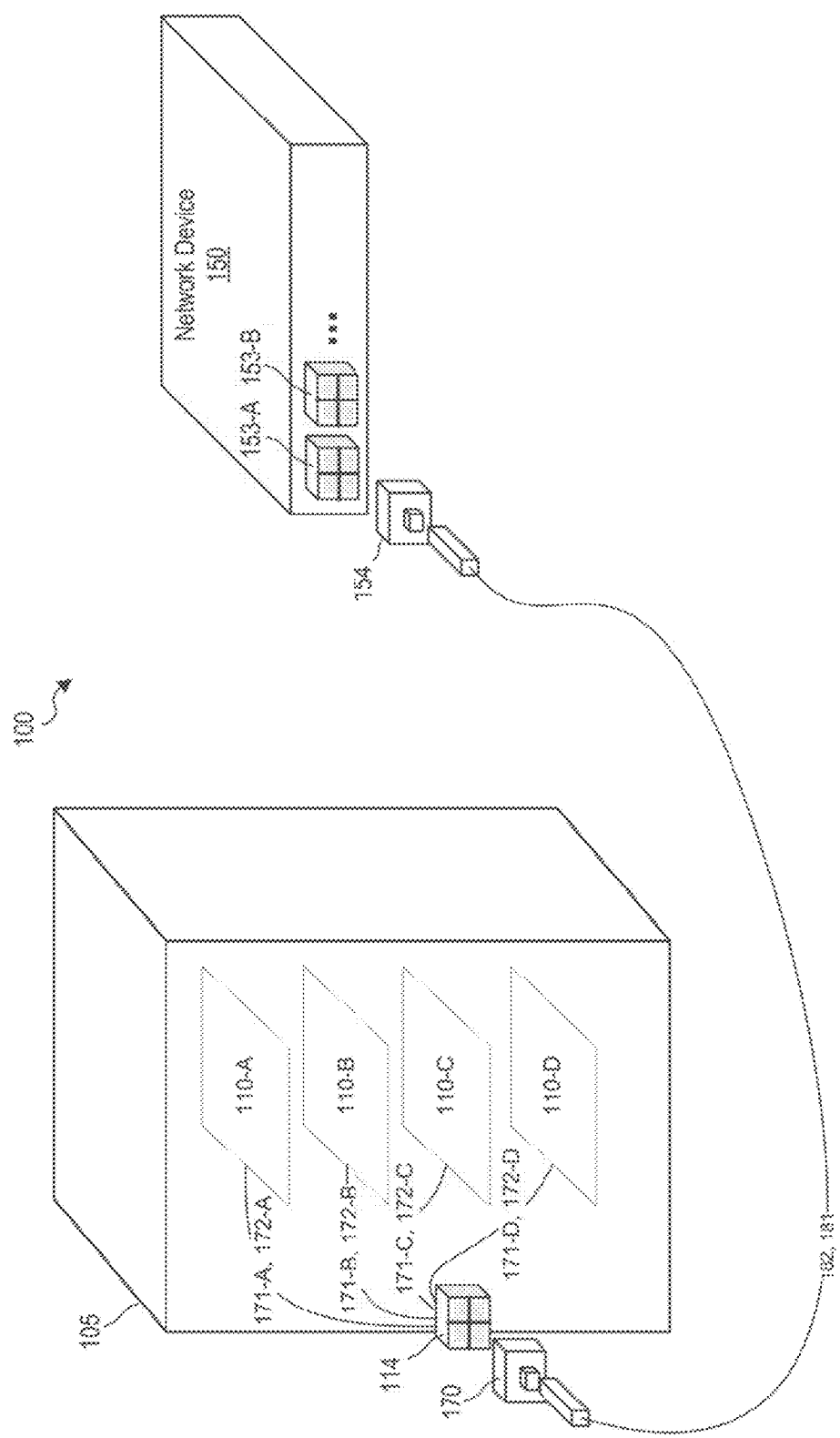

In some examples, as illustrated in FIG. 2C, computing devices 110 (e.g., servers) may be included in an enclosure 105 (e.g., a server rack) having an enclosure connector 114, which may, for example, be similar to connector 153 discussed above. In these examples, each computing devices 110 may be coupled via an optical cable, such as an LC duplex cable or other suitable optical cable, to enclosure connector 114, and optical bus 170 may be attachable to, pluggable into, or otherwise coupled to enclosure connector 114.

Figure 2D:
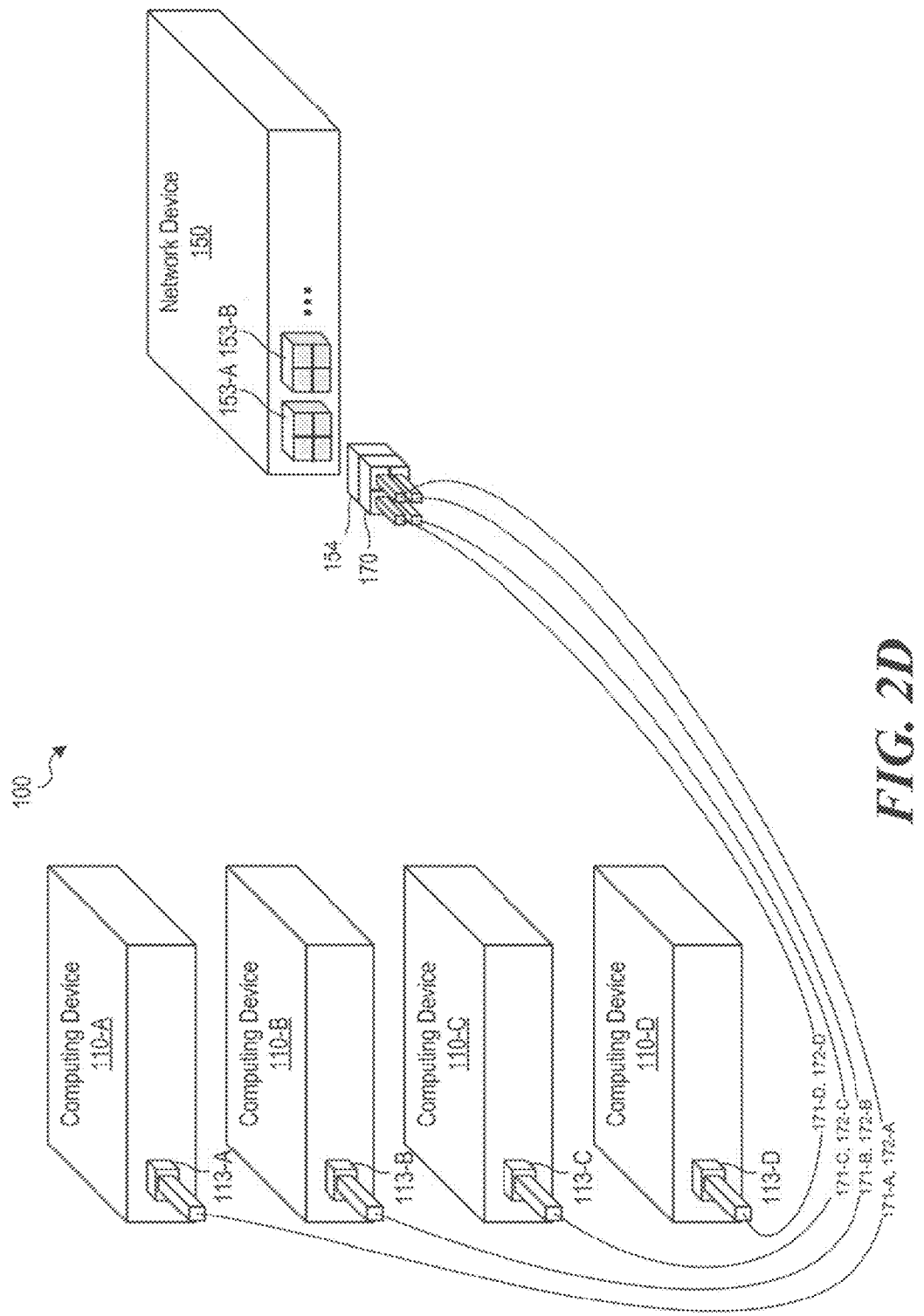

In some examples, as illustrated in FIG. 2D, optical cables carrying waveguides 181 and 182 (illustrated in FIG. 2A) may be omitted, and optical bus 170 may be physically coupled to (e.g., attached or plugged into) module 154. In some examples, optical bus 170 and module 154 may be integrated into the same module that may be attachable to or pluggable info connector 158 and that may be coupled to computing devices 110, for example, through optical cables carrying waveguides 171 and 172.

Referring back to FIG. 2A, network device 150 may generate an optical signal and send the optical signal (e.g., through pert 152-A connector 153-A, multiplexer 156, and optical bus 170) to a plurality of computing devices 110. In some examples, the optical signal may include a plurality of data signals and/or management signals, each signal being associated with a different wavelength. In some examples, the management signal may indicate which data signals are directed to which computing devices 110. Put differently, the management signal may configure each computing device 110 to discard some data signals, for example, by configuring lane switch 115 not to route those signals to input lanes $L0_i$-$L3_i$. In other examples, computing device 110 may be configured to pass all data signals to input lanes $L0_i$-$L3_i$ and to then determine which signals are directed to this computing device 110 based on the signals themselves. For example, each computing device 110 may analyze the packet headers of the date signal, discard the packer if the packet is a unicast packet directed to another computing device 110, and not to discard the packet if the packet is a multicast packet or is a unicast packet directed to the present computing device 110.

As discussed above, the management signal may also indicate, to each computing device 110, how many output signals, if any, the particular computing device 110 may transmit to network device 150 through bus 170. In some examples the management signal may also indicate the particular output lanes ($L0_o$-$L3_o$) from which the computing device 110 may transmit the output signals; in other examples, computing device 110 may determine the particular lanes independently of the management signal. In some examples, the management signal may also indicate which wavelength (e.g., from a plurality of predefined wavelengths such as $\lambda 1$, $\lambda 2$, $\lambda 3$, and $\lambda 4$) is to be associated with each such output signal; in other examples, the management signal may only indicate a set of wavelengths, and computing device 110 may choose which output signals are to be associated with which of the set of wavelengths. In some examples, to avoid interferences between various output signals, the management signal may assign wavelengths to the various output signals of various computing devices such that each output signal is associated with a different wavelength, i.e., no two output signals simultaneously transmitted through bus 170 to port 152 (e.g., 152-A) are associated with the same wavelength.

By using management signals to control which signals may be transmitted by which computing devices 110, network device 150 may control the total bandwidth to be received from all computing devices 110, also referred to as the input bandwidth capacity, as well as the distribution of that bandwidth among computing devices 110. In some examples, network device 150 may determine the input bandwidth capacity based on the upstream output bandwidth capacity. For example, if network device 150 may not transmit to upstream devices more than 10 Gb/s (per port 152), network device 150 may limit the amount of bandwidth to be received from computing devices 110 by a given port 152 to up to 10 Gb/s. Network device 150 may also use any suitable load-balancing algorithm to distribute the input bandwidth capacity among all computing devices 110 connected to the given port 152. In some examples, the distribution may depend at least in part on the individual bandwidth requirements of each computing device 110, and may change with time, e.g., when the individual requirements change. In some examples, for example, when the total bandwidth requirement of computing devices 110 exceeds the input bandwidth capacity, network device 150 may use the management signal to indicate to each computing device 110 one or more time slots during which that computing device 110 may or may not transmit data.

In some examples, a time slot may span a time period where one or more packets can be sent between port 152 and a computing device 110. The duration of a time slot may be selected by port 152. Port 152 may query each computing device 110 connected thereto with regard to its time slot needs, and may instruct each computing device 110 when to start using one or more time slots. Port 152 may also instruct each computing device 110 to stop sending data, e.g., by issuing a stop command such as an Ethernet flow-control PAUSE frame. In some examples, each computing device may request for one or more time slots from the network device. Each computing device 110 may send data to port 152 only during its allotted time slot, and may prematurely relinquish its granted time slot by notifying port 152. Thus, in some examples, to accommodate varying downstream bandwidth requirements of a plurality of computing devices 110, system 100 may selectively enable time-division multiplexing in addition to wave-division multiplexing discussed above.

In the example illustrated in FIG. 3A, computing devices 110 are configured by the network device 150 as follows: device 110-A transmits data from output lane $L0_o$ using wavelength $\lambda 4$, receives data using wavelengths $\lambda 1$-$\lambda 4$, and passes to input lane $L0_i$ only data with wavelength $\lambda 3$; device 110-B transmits data from output lane $L0_o$ using wavelength $\lambda 3$, receives data using wavelengths $\lambda 1$-$\lambda 4$, end passes to input L0= only data with wavelength $\lambda 3$; device 110-C transmits data from output lane $L0_o$ using wavelength $\lambda 2$, receives data using wavelengths $\lambda 1$-$\lambda 4$, and passes to input lane $L0_i$ only data with wavelength $\lambda 2$; and device 110-D transmits data from output lane $L0_o$ using wavelength $\lambda 1$, receives data using wavelengths $\lambda 1$-$\lambda 4$, and passes to input lane $L0_i$ only data with wavelength $\lambda 1$. In this example if each lane L0-L3 of each com puling device 110 cars transmit at a rate of 25 Gb/s, each computing device 110 can transmit and receive data at 25 Gb/s, for a duration instructed by the network device 150.

Figure 3A:
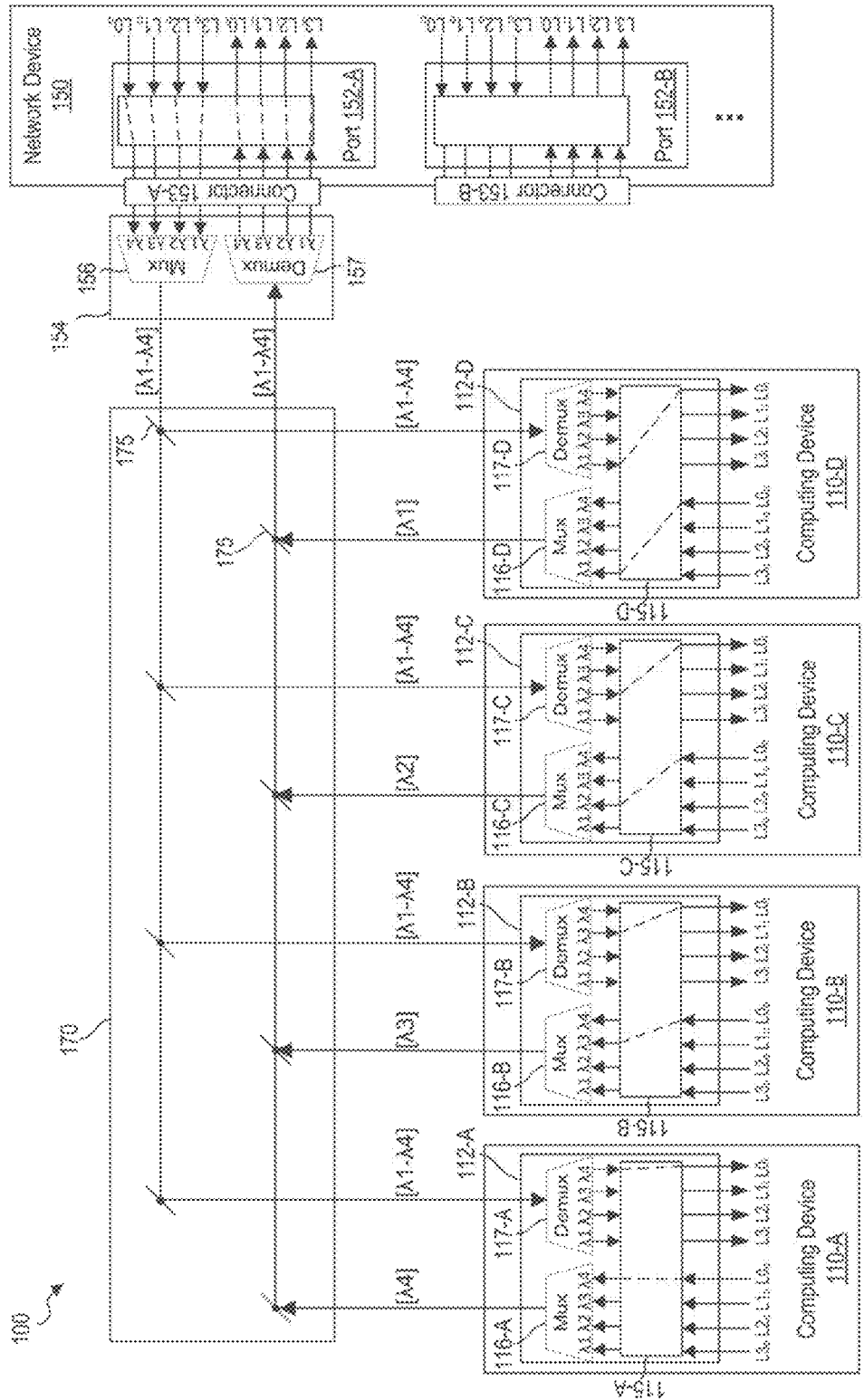
FIGS. 3A-3E show yet other examples of the network system.
Figure 3B:
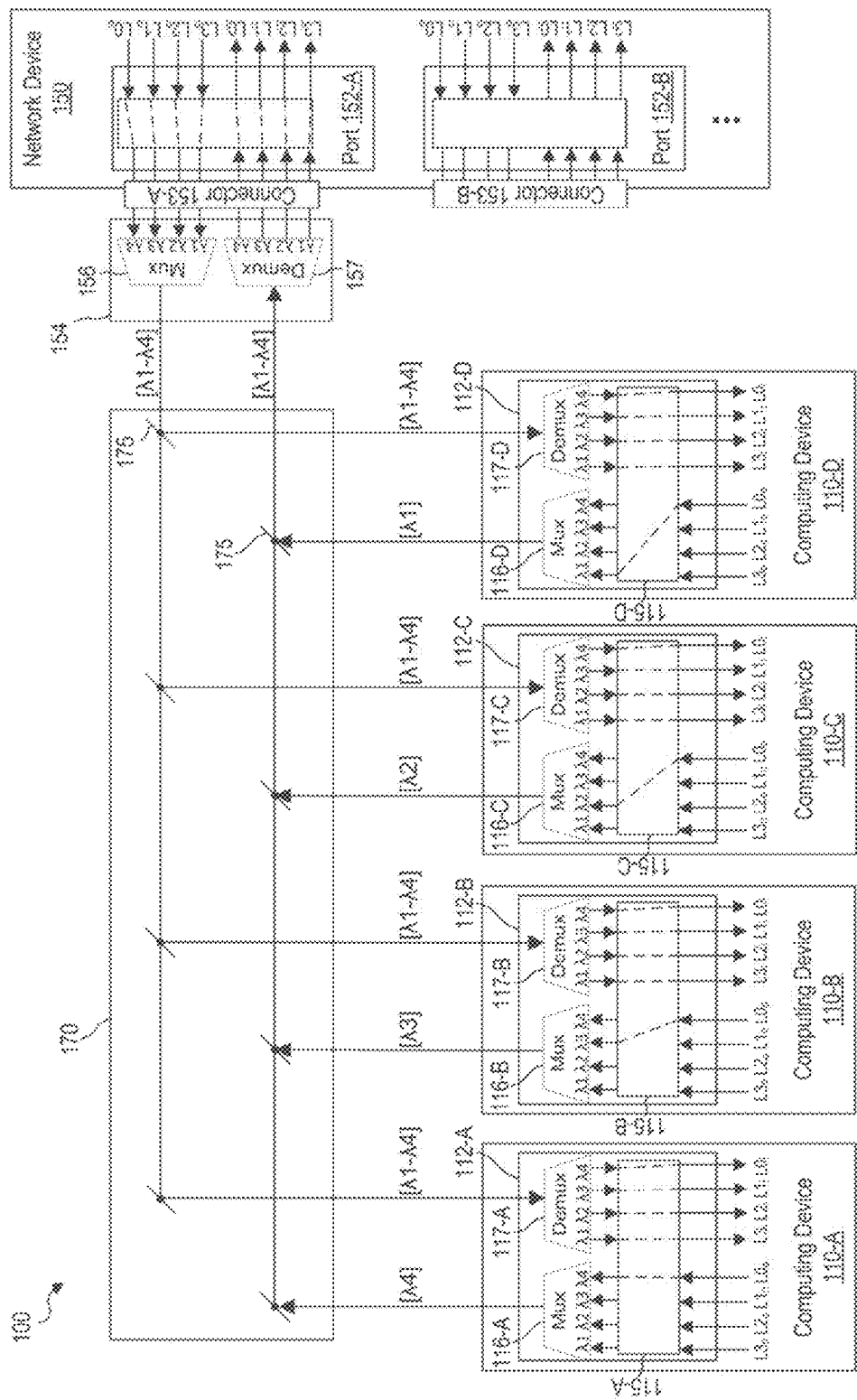

In the example illustrated in FIG. 3B, computing devices 110 are configured by the network device 150 similarly to the way described in FIG. 3A, but each computing device 110 passes all data received from network device 150, leaving it to each computing device 110 to determine (e.g., based on the data itself) which of the data is directed to that device. In this example, if each lane L0-L3 of each computing device 110 can transmit at a rate of 25 Gb/s, each computing device 110 can transmit data at 25 Gb/s and receive data at 100 Gb/s, for a duration instructed by the network device 150.

Figure 3C:
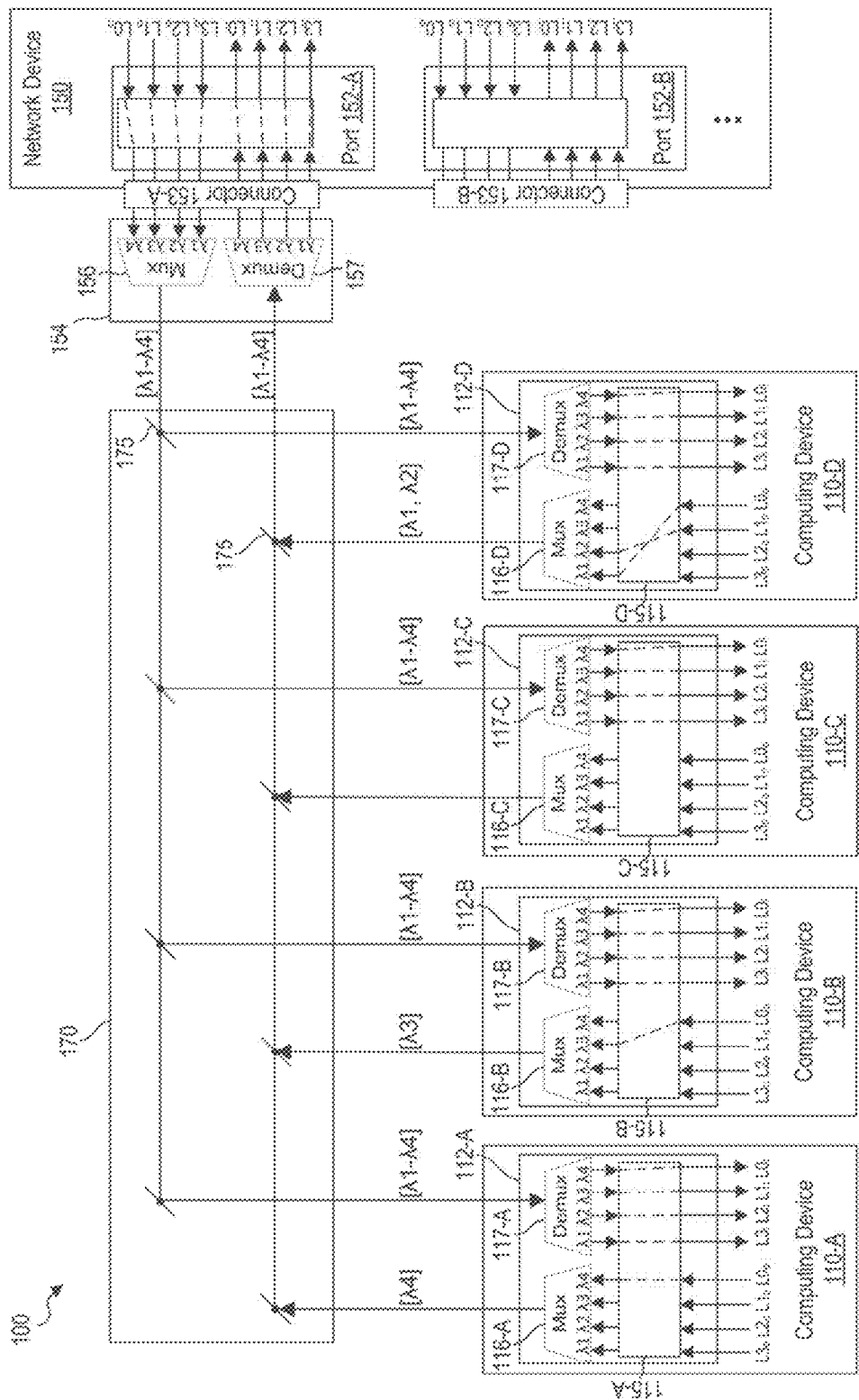

In the example illustrated in FIG. 3C, computing devices 110 are configured similarly to the way described in FIG. 3B, but computing device 110-C is configured by the network device 150 not to transmit any data to network device 150, while computing device 110-D is configured to transmit both from output lane $L0_o$ using wavelength $\lambda 1$ and from output $L1_o$ using wavelength $\lambda 2$. Thus, in this example, if each lane L0-L3 of each computing device 110 can transmit at a rate of 25 Gb/s, each computing device 110 can receive data at 100 Gb/s, devices 110-A and 110-B can each transmit data at 25 Gb/s, device 110-C cannot transmit any data, and device 110-D can transmit data at a combined rate of 50 Gb/s, for a duration instructed by the network device 150.

Figure 3D:
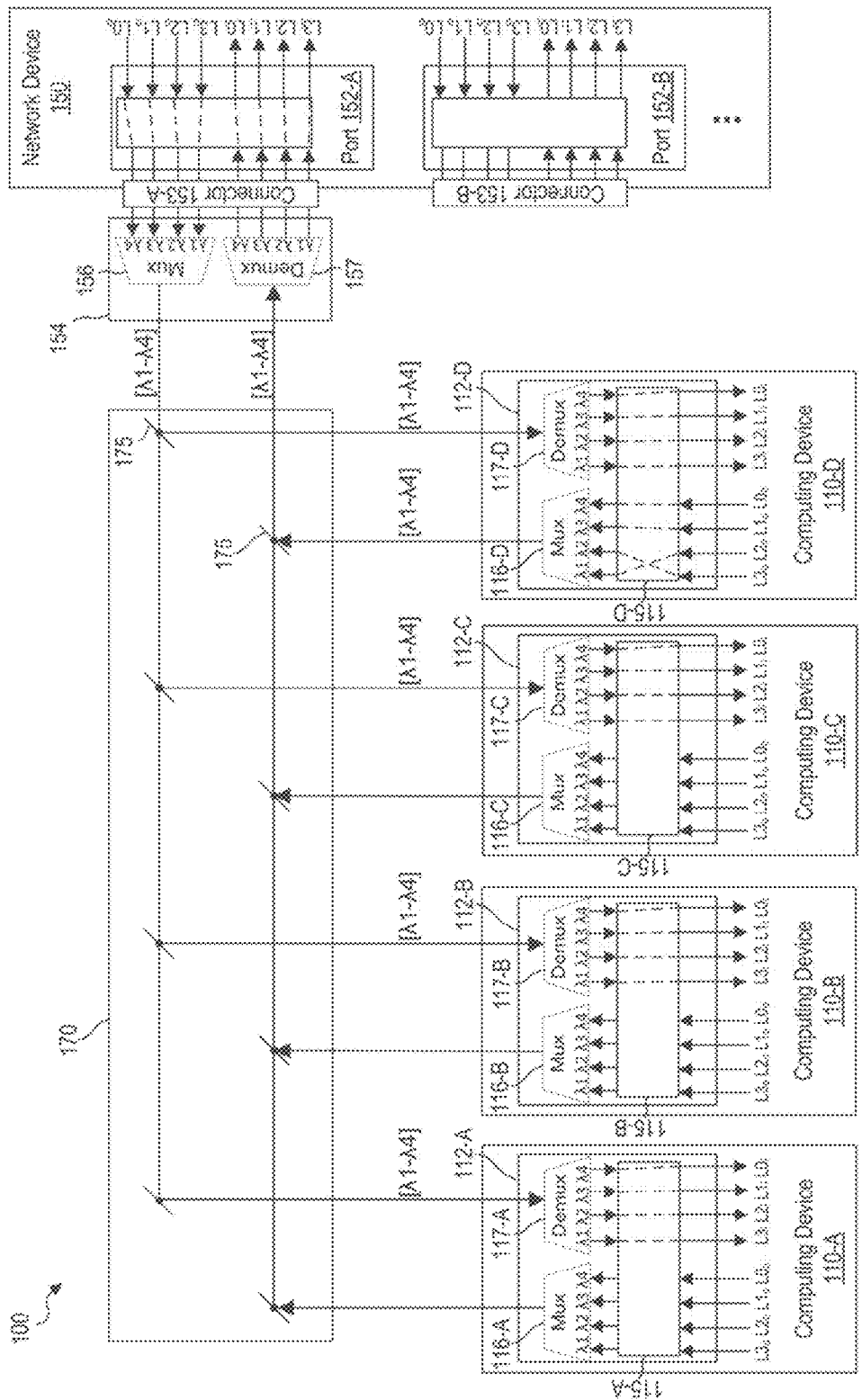

In the example illustrated in FIG. 3D, computing devices 110 are configured by the network device 150 similarly to the way described in FIG. 3C, but computing devices 110-A, 110-B, and 110-C are configured not to transmit any data to network device 150, while computing device 110-D is configured to transmit both from output lanes $L0_o$, $L1_o$, $L2_o$, and $L0_3$ using wavelengths $\lambda 4$, $\lambda 3$, $\lambda 1$, and $\lambda 2$, respectively. Thus, in this example, if each lane L0-L3 of each computing device 110 can transmit at a rate of 25 Gb/s each computing device 110 can receive data at 100 Gb/s. devices 110-A, 110-B, and 110-C cannot transmit any data, and device 110-D can transmit data at a combined rate of 100 Gb/s, for a duration instructed by the network device 150.

Figure 3E:
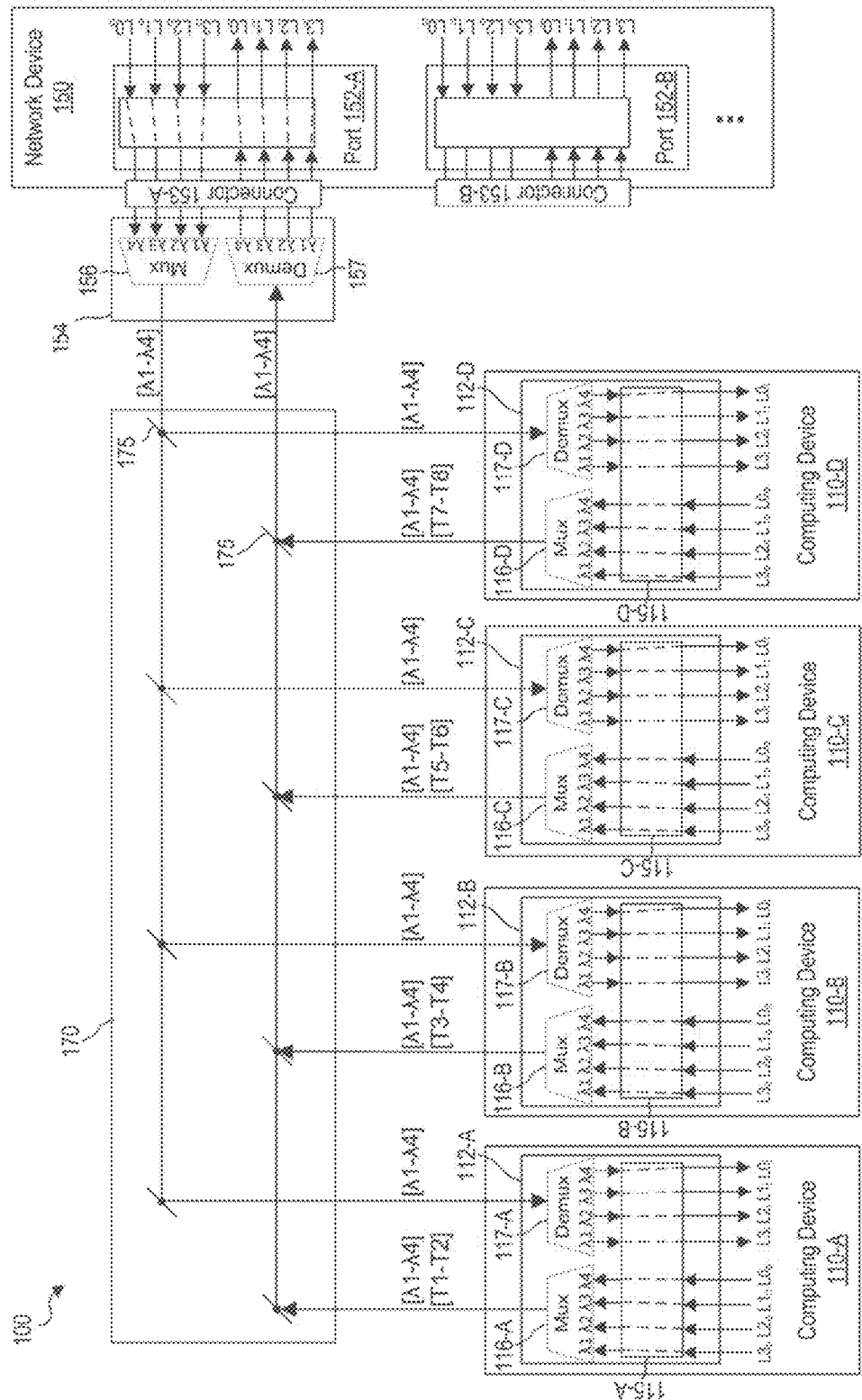

In the example shown in FIG. 3E, each computing device 110 may receive and transmit through all lanes (e.g., at 100 Gb/s) but at different time slots, after instructed by the network device 150, For example, computing devices 110-

A, 110-B, 110-C, and 110-D may transmit during time slots T1-T2, T3-T4, T5-T6, and T7-T8, respectively.

In some examples, some or all functionality of any computing device 110 may be implemented as any combination of hardware and programming. The programming may include processor-executable instructions stored on a tangible, non-transitory computer readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer readable medium can be said to store program instructions that when executed by the processor resource implement the functionality of the respective component. The computer readable medium may be integrated in the same device as the processor resource or it may be separate but accessible to that device and the processor resource. In one example, the program instructions can be part of an installation package that when installed can be executed by the processor resource to implement the corresponding component in this case, the computer readable medium may be a portable medium such as a CD, DVD, or flash drive or a memory maintained by a server from which the installation package can be downloaded and installed. In another example, the program instructions may be part of an application or applications already installed, and the computer readable medium may include integrated memory such as a hard drive, solid state drive, or the like.

Figure 4:
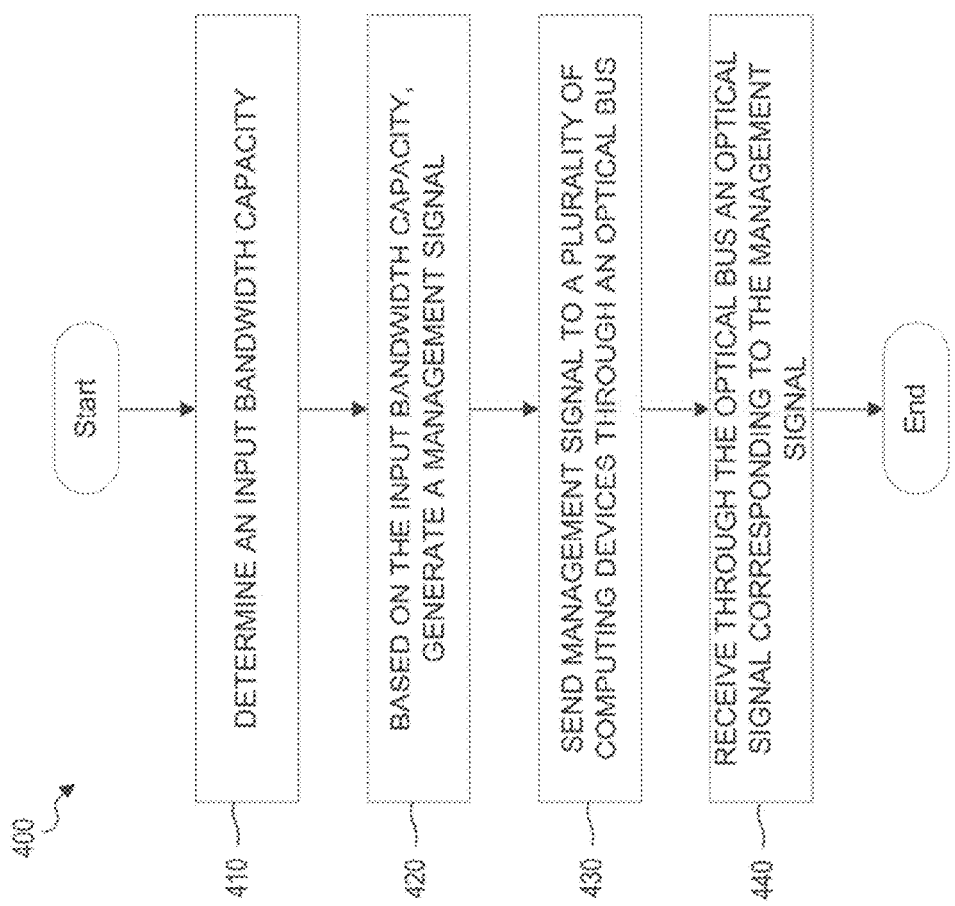
FIG. 4 shows a flowchart of an example method.

FIG. 4 is a flowchart of an example method 400. Method 400 may be described below as being executed or performed by a network device, such as network device 150. Other suitable systems and/or computing devices may be used as well. Method 400 may be implemented in the form of executable instructions stored on at least one non-transitory machine-readable storage medium of the network device and executed by at least one processor of the network device. Alternatively or in addition, method 400 may be implemented in the form of electronic circuitry (e.g., hardware), in alternate examples of the present disclosure, one or more or blocks of method 400 may be executed substantially concurrently or in a different order than shown in FIG. 4, in alternate examples of the present disclosure, method 400 may include more or less blocks than are shown in FIG. 4. In some examples, one or mora of the blocks of method 400 may, at certain times, be ongoing and/or may repeat.

At block 410, method 400 may determine an input bandwidth capacity. At block 420, the method may, based on the input bandwidth capacity, generate, a management signal indicating an allowed number of signals for each of a plurality of computing devices coupled to a network device. As discussed above, the management signal may also indicate a wavelength to be associated with each of the allowed number of signals of each of the plurality of computing devices, and in some examples, a different time slot for transmitting those signals. At block 430, the method may send the management signal to the plurality of computing devices through an optical bus. As discussed above, this may include sending to the plurality of computing devices an optical signal that includes the management signal and a plurality of data signals, where the data management signal and each of the plurality of data signals are associated with a different wavelength. At block 440, the method may receive, through the optical bus, an optical signal corresponding to the management signal. As discussed above, the optical signal may include a plurality of input signals from the plurality of computing devices, and each of the plurality of input signals may be associated with a different wavelength.

The invention claimed is:

1. A computing device coupled to a network device port of a network device vis a cable comprising a first optical waveguide and a second optical waveguide, wherein the computing device is to:
   obtain a plurality of output signals at a plurality of output lanes of the computing device;
   based on management data obtained from the network device port through the first optical waveguide, select from the plurality of output signals a set of selected signals;
   using a lane switch, selectively assign to each of the selected signals one of a plurality of predefined wavelengths in accordance with the management data; and
   provide to the network device port, through the second optical waveguide, an optical output signal representing each of the selected signals using the wavelength assigned to the selected signal.

2. The computing device of claim 1, wherein providing the optical output signal to the network device port comprises providing the optical output signal to an optical bus, wherein the optical bus is to combine the optical output signal with a second optical signal received from a second computing device through a third optical waveguide.

3. The computing device of claim 1, wherein the computing device comprises a multiplexer having a data output and a plurality of data inputs, the data output being optically coupled to the second optical waveguide, and each data input of the multiplexer being associated with a different wavelength, wherein the multiplexer is to:
   obtain the plurality of output signals at the plurality of data inputs of the multiplexer, each output-signal being associated with a different wavelength;
   select the set of selected signals from the plurality of output signals based on the management data; and
   provide the set of selected signals to the data output.

4. The computing device of claim 3, wherein the lane switch is to obtain the plurality of output signals from the plurality of output lanes, selectively assign to each output signal a different wavelength in accordance with the management data, and route the plurality of output signals to the plurality of data inputs of the multiplexer in accordance with the management data.

5. The computing device of claim 1, further comprising a lane switch, wherein the lane switch is to:
   obtain an optical input signal comprising a plurality of input signals from the network device;
   extract the plurality of input signals from the optical input signal; and
   selectively route the plurality of input signals to a plurality of input lanes of the computing device.

6. A network device comprising a network device port, the network device port being coupled to a plurality of computing devices via an optical bus, wherein the network device is to:
   obtain, by the network port, a plurality of electrical output signals from the network device;
   produce, by the network port, an optical output signal representing a management signal and the plurality of electrical output signals, wherein the management signal and the plurality of output signals are represented in the optical output signal by different wavelengths, and wherein the management signal selects a set of output lanes from a plurality of output lanes of each of the plurality of computing devices, and assigns wavelength to each of the set of output lanes;

provide, by the network port, the optical output signal to each of the plurality of computing devices through the optical bus; and receive, by the network port, through the optical bus, an optical input signal comprising, for each computing device, a set of output signals from the set of output lanes selected by the management signal, each output signal being represented by a wavelengths assigned by the management signal.

7. The network device of claim 6, wherein the optical bus comprises at least one partially-transparent mirror to replicate the optical output signal and at least one partially-transparent mirror to produce the optical input signal.

8. The network device of claim 6, wherein the management signal is to control a plurality of optical multiplexers and a plurality of lane switches of the plurality of computing devices.

9. The network device of claim 6, wherein the management signal further indicates, for at least one of the plurality of computing device, a time slot during which the at feast one of the plurality of computing device is allowed to transmit data to the network device port.

10. The network device of claim 6, wherein the network device port is coupled to the optical bus via an optical multiplexor and an optical demultiplexer, wherein:

the optical multiplexer is to generate the optical output signal; and the optical demultiplexer is to receive the optical input signal from the optical bus, and extract a plurality of extracted optical signals representing the plurality of electrical input signals.

11. The network device of claim 10, wherein the network device port comprises a connector attachable to an optical module comprising the optical multiplexer and the optical demultiplexer, wherein the optical module is one of: attachable to the optical bus, and coupled to the optical bus via an optical cable.

12. A method comprising:

determining an input bandwidth capacity of a network device comprising a network device port coupled to a plurality of computing devices;

based on the input bandwidth capacity generating a management signal the management signal indicating a set of output lanes for each of the plurality of computing devices and indicating a different wavelength for each of the set of output lanes of each of a plurality of computing devices;

sending the management signal to the plurality of computing devices through an optical bus; and receiving, through the optical bus, an optical signal comprising, for each computing device, a set of output signals from the set of output lanes indicated by the management signal, each output signal being represented by a wavelength indicated by the management signal.

13. The method of claim 12, wherein the network device port is coupled to the optical bus via an attachable module comprising a demultiplexer to extract the plurality of input signals from the optical signal.

14. The method of claim 12, wherein sending the management signal comprises sending to the plurality of computing devices an optical signal comprising the management signal and a plurality of data signals, wherein the data management signal and each of the plurality of data signals are associated with a different wavelength.

15. The method of claim 12, wherein the management signal further indicates, for each of the plurality of computing devices, a different time slot for transmission.

* * * * *